(12) United States Patent
Li

(10) Patent No.: US 8,988,281 B2
(45) Date of Patent: Mar. 24, 2015

(54) REVERSING RADAR SENSOR COMPONENT

(75) Inventor: Zhitao Li, Zhongshan (CN)

(73) Assignee: Steelmate Co., Ltd, Zhongshan (CN)

( * ) Notice: Subject to any disclaimer, the term of this patent is extended or adjusted under 35 U.S.C. 154(b) by 350 days.

(21) Appl. No.: 13/578,259

(22) PCT Filed: May 19, 2011

(86) PCT No.: PCT/CN2011/074334
§ 371 (c)(1),
(2), (4) Date: Aug. 10, 2012

(87) PCT Pub. No.: WO2012/100472
PCT Pub. Date: Aug. 2, 2012

(65) Prior Publication Data
US 2013/0009528 A1  Jan. 10, 2013

(30) Foreign Application Priority Data
Jan. 28, 2011 (CN) .................. 2011 1 10031158

(51) Int. Cl.
| G01S 7/35 | (2006.01) |
|---|---|
| G01S 13/04 | (2006.01) |
| G01S 13/93 | (2006.01) |
| G01S 7/521 | (2006.01) |
| G01S 7/02 | (2006.01) |
| G01S 13/00 | (2006.01) |

(52) U.S. Cl.
CPC ....................................... *G01S 7/521* (2013.01)
USPC ............ 342/175; 342/27; 342/70; 343/700 R; 343/872

(58) Field of Classification Search
CPC ............. G01S 7/02; G01S 7/52; G01S 7/521; G01S 2007/027
USPC ........... 342/1, 27, 28, 70–72, 175; 340/425.5, 340/435, 436, 437; 701/300, 301; 33/501, 33/505; 73/570, 649; 361/600, 679.01, 361/807, 810; 362/459, 485; 367/87, 93, 367/94, 140; 343/700 R, 878, 872, 873; 439/34
See application file for complete search history.

(56) References Cited

U.S. PATENT DOCUMENTS

| 5,463,384 | A  * | 10/1995 | Juds ............................... 340/435 |
| 5,844,471 | A  * | 12/1998 | Daniel .......................... 340/436 |
| 6,282,969 | B1 * | 9/2001  | Daniel ............................ 367/93 |
| 6,340,187 | B1 * | 1/2002  | Villiere et al. ................... 342/70 |
| 6,614,389 | B2 * | 9/2003  | Suzuki et al. ................... 342/70 |
| 6,693,520 | B2 * | 2/2004  | Li ................................. 340/435 |
| 6,720,868 | B2 * | 4/2004  | Flick ............................. 340/435 |
| 6,909,376 | B2 * | 6/2005  | Rennick ........................ 340/435 |
| 6,909,405 | B2 * | 6/2005  | Kondo ............................ 342/70 |

(Continued)

*Primary Examiner* — Bernarr Gregory

(57) ABSTRACT

A reversing radar Sensor Component presented by the invention includes a sensor, a damping rubber ring sleeved on a peripheral portion of the sensor, a base cover for receiving a front portion of the sensor and damping rubber ring therein, and a top cover capable of being mounted with the base cover and having an opening defined therein for exposing the front portion of the sensor therefrom. Both the base cover and top cover have several walls formed thereon. Several grooves are defined in the wall of the top cover. A buffer rubber ring is disposed between the wall of the top cover and wall of the base cover. The buffer rubber ring has plural protruding posts corresponding to the grooves. The buffer rubber ring and circular rubber sleeve and damping rubber ring form together double damping construction which increases the protection of the sensor from vibration.

10 Claims, 3 Drawing Sheets

(56) References Cited

U.S. PATENT DOCUMENTS

| | | | |
|---|---|---|---|
| 7,009,577 B1* | 3/2006 | Dolson | 343/878 |
| 7,084,744 B2* | 8/2006 | Li | 340/435 |
| 7,239,230 B2* | 7/2007 | Li | 340/435 |
| 7,240,555 B2* | 7/2007 | Kawashima | 340/435 |
| 7,246,523 B2* | 7/2007 | Magane et al. | 73/649 |
| 7,313,960 B2* | 1/2008 | Kawashima | 340/435 |
| 7,347,597 B2* | 3/2008 | French | 362/485 |
| 7,435,092 B2* | 10/2008 | Grant | 439/34 |
| 7,613,013 B2* | 11/2009 | Gau | 361/810 |
| 7,616,102 B2* | 11/2009 | Kudelko et al. | 340/435 |
| 7,626,888 B2* | 12/2009 | Nakano et al. | 340/435 |
| 7,784,855 B2* | 8/2010 | Faass et al. | 340/435 |
| 8,059,490 B2* | 11/2011 | Rapps et al. | 367/140 |
| 8,112,897 B2* | 2/2012 | Valoff et al. | 33/505 |
| 8,125,321 B2* | 2/2012 | Kojima et al. | 340/435 |
| 8,411,532 B2* | 4/2013 | Tsuzuki et al. | 367/140 |
| 2002/0130770 A1* | 9/2002 | Keyworth et al. | 340/436 |

* cited by examiner

REVERSING RADAR SENSOR COMPONENT

FIELD OF THE INVENTION

The invention relates to a reversing radar Sensor Component used for automobile.

BACKGROUND OF THE INVENTION

Chinese Patent No. CN2929296 discloses a device for mounting the sensor of a reversing radar system. The reversing radar disclosed in this document is representative of most construction in the pertinent technical field.

It can be seen from the specification and drawings of above technical, solution that the sensor of the reversing radar is inserted into a lid around which a damping cushion is disposed for protection of the sensor, thus protecting the damping cushion from being damaged due to vibration of the automobile.

It has proved by practice that the protection of the above damping cushion is limited extremely. More specifically, forces will be applied from the automobile bumper guard to the column portion of the sensor during running process of the automobile during which large vibration happens, and therefore, the following problems arise:

At first, as the resiliency of the damping cushion is limited, the forces applied onto the column portion of the securing device will be directly delivered to the column portion of the sensor, thus resulting in slight vibration of the sensor, which in turn causes offset of the sensor from its original position, thus leading to wrong signal detection and false alarm.

Secondly, the reason of the forces imposed on the column portion of the securing device being directly delivered to the damping cushion surface is that the damping cushion is an integral part and the securing device is tightly engaged with the cushion, thus the room in which the deformation happens being insufficient. In other words, delivery of the forces can't be buffered.

Thirdly, as toothed thorn is formed between the peripheral and bumper guard, and there is rigid connection between the two, the forces are directly delivered to the sensor.

Furthermore, since the connection between the bumper guard and toothed thorn is rigid, and the mechanical rigidity of the toothed thorn is larger than its toughness, the toothed thorn is susceptible to being broken due to press of the bumper guard, thus resulting in instability in installation of the entire sensor and bumper guard, adversely influencing the normal operation of the sensor, and even leading to more serious problems.

SUMMARY OF THE INVENTION

One object of the invention is to provide a reversing radar Sensor Component for better maintaining normal operation of the sensor, avoiding influence of the automobile vibration so as to realize accurate detection, as well as extending the life-span of the sensor.

To achieve the above object, the following technical solution is provided.

The reversing radar Sensor Component presented by the invention includes a sensor, a damping rubber ring sleeved on a peripheral portion of the sensor, a base cover for receiving a front portion of the sensor and damping rubber ring therein, and a top cover capable of being mounted with the base cover and having an opening defined therein for exposing the front portion of the sensor therefrom. Both the base cover and top cover have several walls formed thereon. Several grooves are defined in the wall of the top cover. A buffer rubber ring is disposed between the wall of the top cover and wall of the base cover. The buffer rubber ring has plural protruding posts corresponding to the grooves.

To enhance reliable connection, the buffer rubber ring is press-fitted with the top cover and base cover.

The both ends of the protruding post is designed to have a slope configuration so as to insert the post into the groove.

To facilitate fixation, a circular rubber sleeve, which is sleeve on the peripheral portion of the sensor, is disposed between an exposed peripheral portion of the sensor and the top cover.

To increase buffer space of the protruding post, corresponding to each protruding post, an axially extended slot is formed in an inner surface of the wall of the buffer rubber ring. The slot also extends inside the protruding post. Outwardly opened ramps are formed on the inner surface of the all of the buffer rubber ring at two sides of the slot of the protruding post To maintain stable connection between the top cover and base cover, the base cover has a plurality of snapping members formed on its outer surface of the wall, while the top cover has a plurality of locating holes defined in its wall at locations corresponding to the snapping members. The buffer rubber ring has a plurality of through holes defined in locations corresponding to the snapping members for passing through of the snapping members. The snapping members of the base cover come across the through holes of the buffer rubber ring and are secured into respective locating holes of the top cover. A back portion of the base cover has a stepped portion formed thereon. The diameter of the stepped portion is larger than that of a front portion of the base cover. A distal end of the wall of the top cover is able to be pressed against the circular stepped portion.

To more effectively mount the electrical components, a circuit board electrically coupled to the sensor is secured onto a back end surface of the base cover.

To enhance the protection, a rear cover is provided on the back end of the base cover for connecting with the base cover.

Compared with prior art, the invention has the following advantages.

Firstly arrangement of the buffer rubber ring helps to maintain reliable connection between the top cover and base cover such that during installation of the reversing radar sensor with the automobile bumper guard, little shock will occur.

Secondly, the buffer rubber ring and circular rubber sleeve and damping rubber ring form together double damping construction which increases the protection of the sensor from vibration.

Additionally, since the protruding posts of the buffer rubber ring are pressed against the automobile bumper guard, when one side of the buffer rubber ring is deformed due to application of the external forces which may be resulted from vibration of the automobile, the grooves defined in the other side of the post will compress the air, such that deformation will happen mostly on the posts of the buffer rubber ring. As a result, the external forces will not be directed to the sensor through the wall of the base cover and damping rubber ring, thus protecting the sensor from vibration and avoiding false alarm of the sensor. Furthermore, the inner surface of the wall of the buffer rubber ring at locations corresponding to the openings of the grooves of the post is designed to have outwardly opened ramp configuration and therefore, the space in which the deformation of the post occurs is increased, thus enhancing the buffering effect of the buffer rubber ring.

In addition, compared to rigid component to be connected with the bumper guard, as the buffer rubber ring of the invention is full of resiliency and is press-fitted with the top cover, base cover and bumper guard, the connection among these components is more reliable, and the life-span of the components is also extended due to strong toughness of the buffer rubber ring.

DETAILED DESCRIPTION OF THE INVENTION

Various embodiments of the invention will be described below in further detail with reference to the accompanying drawings.

Figure 1:
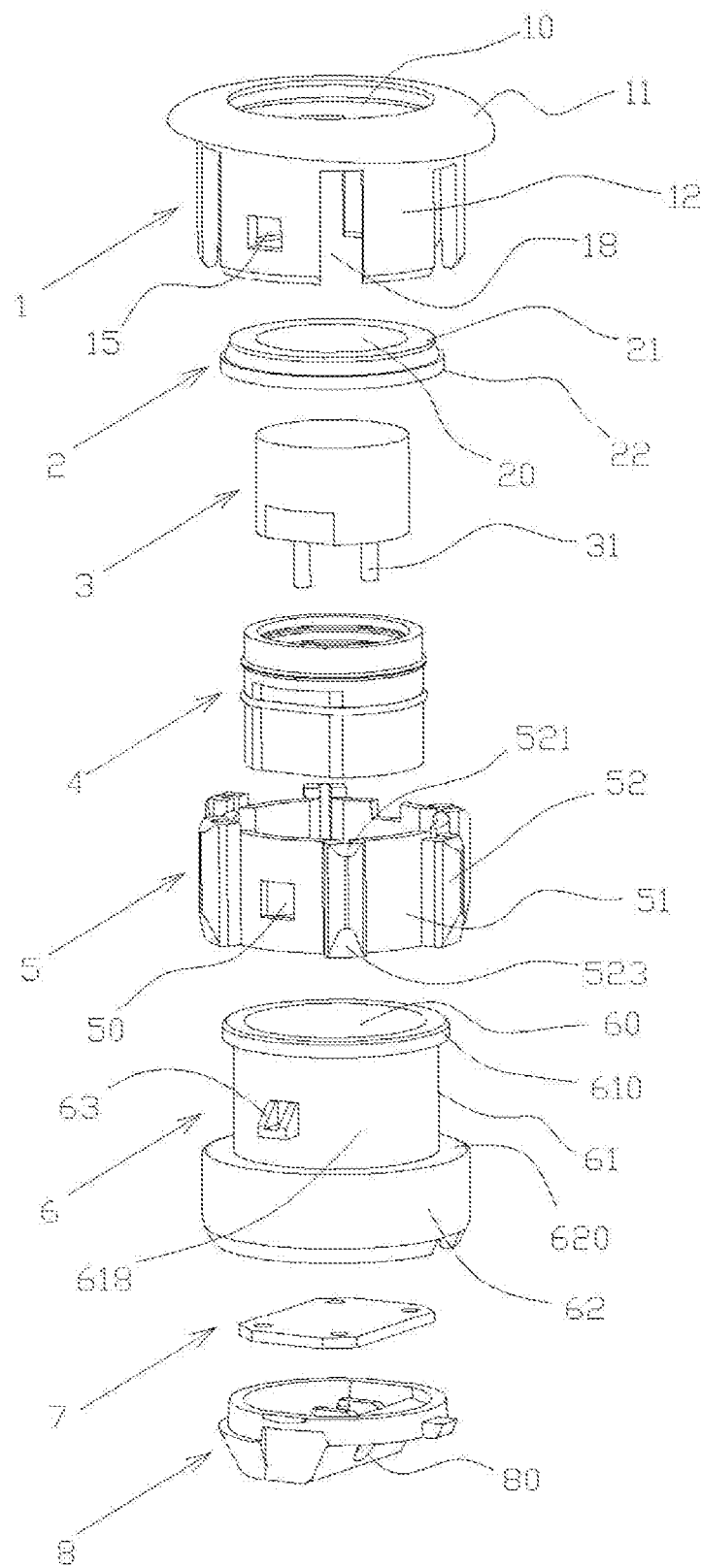
FIG. 1 shows an exploded perspective view of a reversing radar Sensor Component of the present invention.

Reference is made to FIG. 1 which illustrates from top to bottom a top cover 1, a circular rubber sleeve 2, a sensor 3, a damping rubber ring 4, a buffer rubber ring 5, a base cover 6, a circuit board 7 and a rear cover 8. In the following description, the up direction of FIG. 1 will be defined as the front portion (direction), while the down direction of FIG. 1 will be defined as the back portion (direction).

Figure 2:
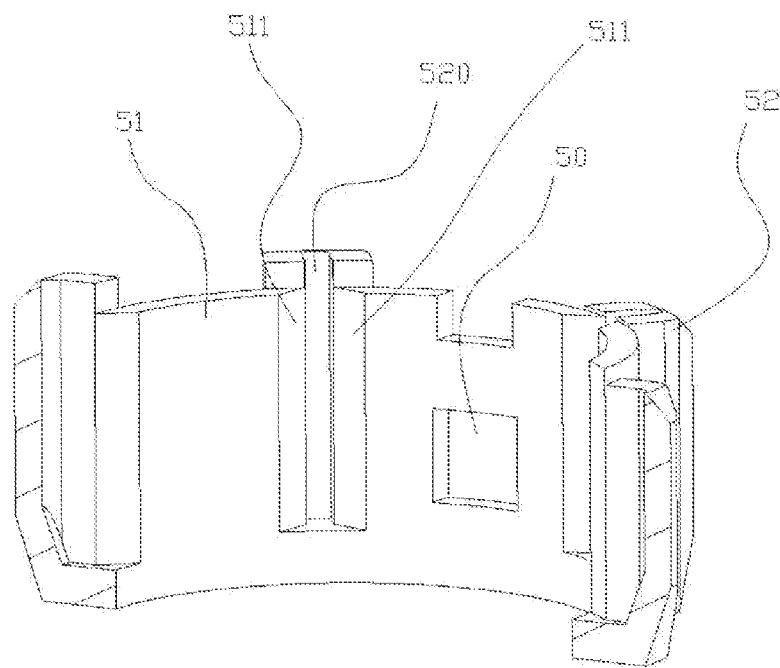
FIG. 2 shows an assembled, sectional perspective view of the reversing radar Sensor Component of the present invention.

The detailed construction of every component of the reversing radar Sensor Component of the present invention and their connection relationship will be described in conjunction with FIGS. 1 and 2.

The top cover 1 has an annular flat front end surface 11 in the middle of which an opening 10 is defined axially. An annular wall 12 is extended in a back direction from the end surface 11. A plurality of locating holes 15 is defined in the wall 12. In addition, a plurality of grooves 18 is defined in the wall 12 and extends axially from back direction to the front direction. The inner diameter of the wall 12 is greater than that of the opening 10 so that a cylindrical space is define by the wall 12 for accommodating other components which will be mentioned below.

A through hole 20 is defined at a central portion of the circular rubber sleeve 2, and the sleeve 2 includes an upper portion 21 and a lower portion 22 larger than the upper portion 21 in size such that the sleeve 2 can encircle the front peripheral portion of the sensor 3 and can engage tightly the front portion of the cylindrical space of the top cover 1.

The sensor 3 is of a cylindrical shape and a plurality of pins 31 is provided on the back portion thereof for connecting with the circuit board 7.

The damping rubber ring 4 is of a barrel shape and has structure formed therein for engaging with the sensor 3 so as to locate the sensor therein. In addition, the damping rubber ring 4 has an extended axial height for protection of two pins 31 of the sensor 3. The damping rubber ring 4 is sleeved on the back peripheral portion of the sensor 3, whereas the circular rubber sleeve 2 is sleeved on the front peripheral portion of the sensor 3. In other words, both the damping rubber ring 4 and circular rubber sleeve 2 are sleeved on an external cylindrical surface of the sensor 3, thereby forming a first protective construction for the sensor 3. It is noted that the damping rubber ring 4 can be pressed against the circular rubber sleeve 2.

Figure 3:
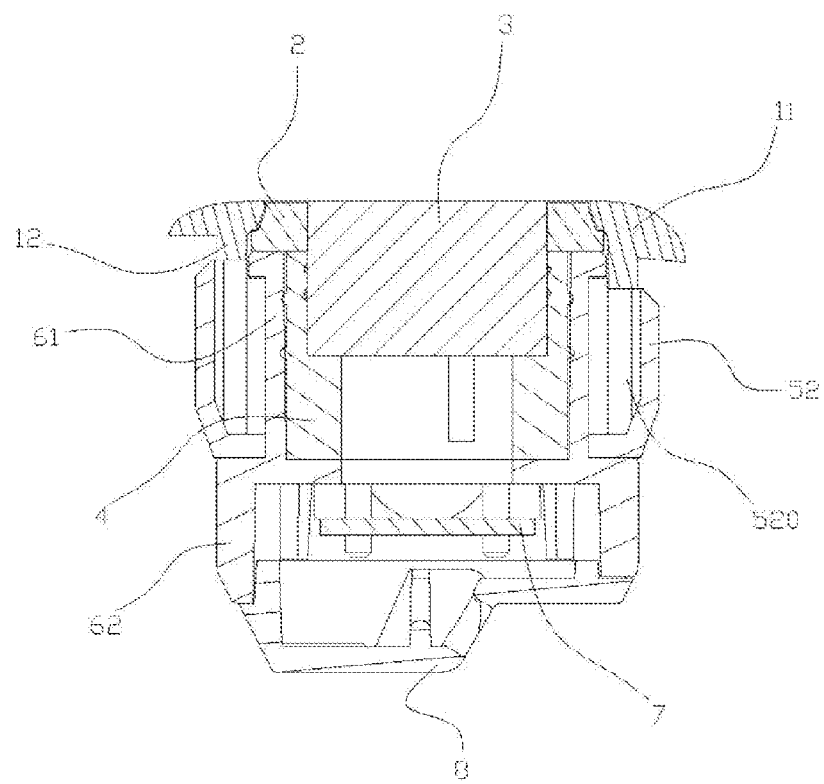
FIG. 3 shows a partial sectional view of a damping rubber ring of the present invention.
Figure 4:
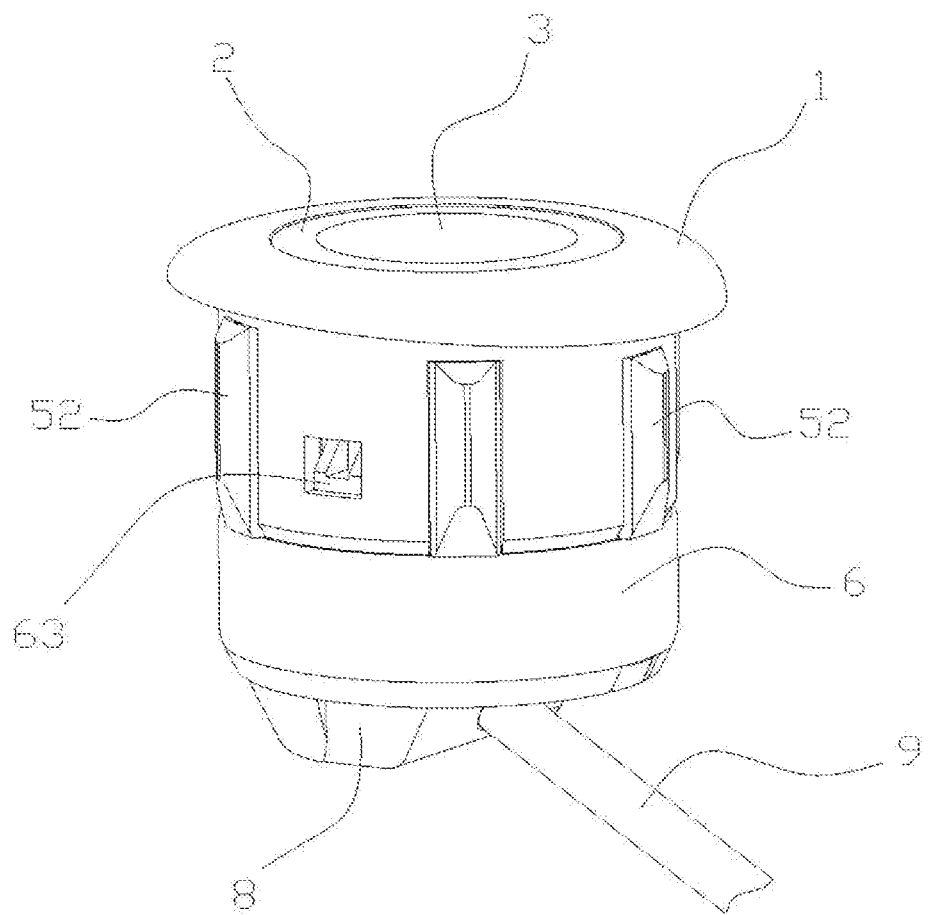
FIG. 4 shows an assembled perspective view of the reversing radar Sensor Component of the present invention.

A second protective construction is formed by the buffer rubber ring 5 the detailed structure of which will be discussed with reference to FIG. 3. The buffer rubber ring 5 is of a barrel shape made of rubber material. A wall 51 is provided on the buffer rubber ring 5, and the outer diameter of the wall 51 matches with the inner diameter of the base cover 6. Alternatively, the wall 51 may be press-fitted into the base cover 6. Corresponding to the plurality of grooves 18 of the top cover 1, a plurality of protruding posts 52 is provided on the buffer rubber ring 5. These protruding posts 52 of the buffer rubber ring 5 are formed integrally with the wall 51 and extrude from the external surface of the wall 51 so that these posts 52 can be received into corresponding grooves 18 of the top cover 1. Similarly, to maintain stable engagement between the protruding posts 52 and corresponding grooves 18, the width of the posts 52 may be designed to be slightly larger than the horizontal width of the grooves 18 so as to obtain press-fit between the two components. Two ends 521, 523 of each protruding post 52 along the axial direction of the buffer rubber ring 5 are designed to have a slope configuration, thereby facilitating insertion of the protruding post 52 into corresponding groove 18 and avoiding collision and jam among the components. Each protruding post 52 has an axially extended slot 520 formed in the inner surface of the wall 51 of the buffer rubber ring 5. The slot 520 also extends inside the protruding post 52 such that the entire post 52 forms a concave construction. When the outer surface of the protruding post 52 is pressed, the deformation of the post 52 will happen in a large free space. To further enlarge the free space for deformation of the post 52 and enhance the buffer effects of the buffer rubber ring 5, as shown in FIG. 3, a transition portion 511, which is located between the inner surface of the wall 51 of the buffer rubber ring 5 and the slot 520 of the protruding post 52, is designed to be an outwardly opened ramp. There are two ramps formed at both sides of an opening of the slot 520. Owing to the ramped transition portion 511, the space in which deformation of the protruding post 52 occurs is further enlarged and, the entire buffer rubber ring 5 will have enhanced resiliency, thus significantly improving shock-absorption capability.

The base cover 6 includes a front portion 61 designed to be an upwardly opened barrel and a back portion 62 designed to be a downwardly opened platform. In addition, the outer diameter of the back portion 62 is greater than that of the front portion 61 such that a stepped portion 620 is defined on the back portion 62. When the top cover 1 is secured onto the base cover 6, the distal end of the wall of the top cover 1 will be pressed against the stepped portion 620 of the base cover 6. The front rim 610 of the front portion 61 of the base cover 6 is an annular shape with a greater outer diameter than the front portion so as to define between the stepped portion 620 and front rim 610 an annular slot 618 on which the buffer rubber ring 5 is sleeved. Corresponding to the plurality of locating holes 15 of the top cover 1, a plurality of snapping members 63 is provided on the outer surface of the wall of the front portion 61 of the base cover 6. In other words, these snapping members are formed on the peripheral of the annular slot 618. These snapping members 63 might be snap-fitted into the locating holes 15 such that the base cover 6 and top cover 1 are secured with each firmly. To more reliably secure the buffer rubber ring 5 onto the annular slot 618 of the base cover 6, the inner diameter of the ring 5 is slightly larger than the outer diameter of the annular slot 618 so as to form press-fit between the two components. Correspondingly, to make sure that the snapping members 63 which are provided on the outer surface of the annular slot 618 of the base cover 6, pass through the buffer rubber ring 5 and then are snapped onto the top cover 1, a plurality of through holes 50 is defined in the wall at locations corresponding to the snapping members 63 (or locating holes 15), of the buffer rubber ring 5. It is clear that space 60 defined between the wall of the top cover 1 and all of the front portion 61 of the base cover 6 is sufficient to receive the buffer rubber ring 5. As described above, the front portion 61 of the base cover 6 is designed to be an upwardly opened barrel and therefore, an upwardly opened receiving space 60 is defined for receiving the damping rubber ring 4 and the sensor 3 provided thereon. Moreover, the receiving space 60 of the base cover 6 has a connective construction for connecting the two pins 31 of the sensor 3 to the circuit board 7 placed inside the space 60. The rear cover 8 is located on the back portion of the base cover 6, and the rear cover 8 is locked with the back portion of the base cover 6 so as to enclose the circuit board 7 therein.

The characteristic of the circuit board 7 is irrelevant to the subject matter of the invention and accordingly, description thereto is omitted. A through hole 80 is defined in the rear cover 8 through which an external control cable may pass so as to be connected with the circuit board 7.

The detailed assembly process of the reversing radar Sensor Component of the present invention is discussed below in conjunction with FIGS. 1-4.

At first, the sensor 3 is inserted into the damping rubber ring 4. As there is textured structure inside the ring 4 for securing the sensor 3, the sensor 3 can be stably secured into the damping rubber ring 4.

Next, the damping rubber ring 4 together with the sensor 3 is placed into the front receiving space 60 of the base cover 6 such that the pins 31 of the sensor 3 are connected with the circuit board 7 located on the base cover 6.

After that, the buffer rubber ring 5 is sleeved on the annular slot 618 of the base cover 6, the snapping members 63 pass through the through holes 50 predefined in the buffer rubber ring 5, and the circular rubber sleeve 2 is sleeved onto the front peripheral portion of the sensor 3.

Then, the top cover 1 is placed downwardly onto the base cover 6, and the snapping members 63 of the base cover 6 are snapped into the corresponding locating holes 15 of the top cover 1, thus realizing assembling of the base cover 6 and top cover 1.

Finally, a control cable 9 passes through the through hole 80 of the rear cover 8 and then is connected to the circuit board 7 of the base cover 6, and finally the rear cover 8 is installed thereon, hence completing the entire assembly process.

In a summary, in the reversing radar Sensor Component provided by the invention, due to existence of the buffer rubber ring 5 which forms together with the circular rubber sleeve 2 and damping rubber ring 4 double-buffering construction, and due to great buffering effects brought by protruding posts 52 of the buffer rubber ring 5, the whole assembly can be more reliably mounted with the automobile bumper guard, thus protecting the sensor 3 itself more effectively and avoiding false alarm resulted from automobile vibration.

Though various embodiments of the invention have been illustrated above, a person of ordinary skill in the art will understand that, variations and improvements made upon the illustrative embodiments fall within the scope of the invention, and the scope of the invention is only limited by the accompanying claims and their equivalents.

The invention claimed is:

1. A reverse parking radar Sensor Component comprising a sensor, a damping rubber ring sleeved on a peripheral portion of the sensor, a base cover for receiving a front portion of the sensor and damping rubber ring therein, and a top cover capable of being mounted with the base cover and having an opening defined therein for exposing the front portion of the sensor therefrom, the base cover and top cover each having a cylindrical side wall erectly defined therefrom, several grooves being defined in the cylindrical side wall of the top cover, wherein a buffer rubber ring is disposed between the cylindrical side walls of the top cover and base cover, and the buffer rubber ring has plural protruding posts corresponding to the grooves.

2. The reverse parking radar Sensor Component according to claim 1, wherein the buffer rubber ring is press-fitted with the top cover and base cover.

3. The reverse parking radar Sensor Component according to claim 1, wherein the both ends of the protruding post is designed to have a slope configuration.

4. The reverse parking radar Sensor Component according to claim 1, wherein a circular rubber sleeve, which is sleeve on the peripheral portion of the sensor, is disposed between an exposed peripheral portion of the sensor and the top cover.

5. The reverse parking radar Sensor Component according to claim 4, wherein corresponding to each protruding post, an axially extended slot is formed in an inner surface of the wall of the buffer rubber ring; and the slot also extends inside the protruding post.

6. The reverse parking radar Sensor Component according to claim 5, wherein outwardly opened ramps are formed on the inner surface of the wall of the buffer rubber ring at two sides of the slot of the protruding post.

7. The reverse parking radar Sensor Component according to claim 5, wherein the base cover has a plurality of snapping members formed on its outer surface of the wall, while the top cover has a plurality of locating holes defined in its wall at locations corresponding to the snapping members; the buffer rubber ring has a plurality of through holes defined in locations corresponding to the snapping members for passing through of the snapping members; and the snapping members of the base cover come across the through holes of the buffer rubber ring and are secured into respective locating holes of the top cover.

8. The reverse parking radar Sensor Component according to claim 5, wherein a back portion of the base cover has a stepped portion formed thereon; the diameter of the stepped portion is larger than that of a front portion of the base cover; and a distal end of the wall of the top cover is able to be pressed against the circular stepped portion.

9. The reverse parking radar Sensor Component according to claim 5, wherein a circuit board electrically coupled to the sensor is secured onto a back end surface of the base cover.

10. The reverse parking radar Sensor Component according to claim 9, wherein a rear cover is provided on the back end of the base cover for connecting with the base cover.

* * * * *